US012615485B2

(12) United States Patent
Zeltzer et al.

(10) Patent No.: US 12,615,485 B2
(45) Date of Patent: Apr. 28, 2026

(54) MONITORING DISPLACEMENT OF A MEMBRANE IN AN ELECTROSTATIC ACOUSTIC DEVICE

(71) Applicant: Waves Audio Ltd., Tel Aviv (IL)

(72) Inventors: Gabriel Zeltzer, Lapid (IL); Meir Shaashua, Tel Aviv (IL)

(73) Assignee: Waves Audio Ltd, Tel Aviv (IL)

( * ) Notice: Subject to any disclaimer, the term of this patent is extended or adjusted under 35 U.S.C. 154(b) by 257 days.

(21) Appl. No.: 18/237,426

(22) Filed: Aug. 24, 2023

(65) Prior Publication Data

US 2023/0403525 A1 Dec. 14, 2023

Related U.S. Application Data

(63) Continuation-in-part of application No. 17/925,642, filed as application No. PCT/IL2021/050536 on May 11, 2021, now Pat. No. 11,910,150.

(30) Foreign Application Priority Data

May 18, 2020 (GB) ...................................... 2007324

(51) Int. Cl.
| | |
|---|---|
| *H04R 29/00* | (2006.01) |
| *G01D 5/14* | (2006.01) |
| *H04R 3/04* | (2006.01) |
| *H04R 19/02* | (2006.01) |

(52) U.S. Cl.
CPC ............. *H04R 29/001* (2013.01); *G01D 5/14* (2013.01); *H04R 3/04* (2013.01); *H04R 19/02* (2013.01)

(58) Field of Classification Search
None
See application file for complete search history.

(56) References Cited

U.S. PATENT DOCUMENTS

| | | | |
|---|---|---|---|
| 2,968,695 A | 1/1961 | Corliss et al. | |
| 3,668,335 A | 6/1972 | Beveridge | |
| 3,773,976 A | 11/1973 | Beveridge | |
| 10,771,903 B2 * | 9/2020 | Zhou | H04R 19/005 |
| 2005/0281419 A1 | 12/2005 | Miyazaki | |
| 2006/0072770 A1 | 4/2006 | Miyazaki | |
| 2007/0124620 A1 | 5/2007 | Miyazaki | |
| 2014/0241536 A1 | 8/2014 | Adams | |
| 2020/0105243 A1 | 4/2020 | Jorritsma | |

FOREIGN PATENT DOCUMENTS

| | | |
|---|---|---|
| GB | 2595234 | 5/2022 |
| GB | 2602775 | 1/2023 |
| JP | 6274497 B2 | 2/2018 |

* cited by examiner

*Primary Examiner* — Paul W Huber
(74) *Attorney, Agent, or Firm* — Hanan Farber Patent Agent Ltd.

(57) ABSTRACT

Monitoring time-dependent displacement of a membrane in an electrostatic acoustic device. An oscillator is configured to produce a probe signal varying at radio frequency. The probe signal is symmetrically coupled into the first and second electrodes. DC bias voltages are symmetrically applied to the first and second electrodes. A voltage signal from the membrane is sensed and input at a high pass filter input. A multiplier is configured to input the filtered signal modulated at radio frequency and portion of the probe signal. The multiplier is configured to output a multiplied signal which is demodulated to produce therefrom an audio output signal responsive to the time-dependent displacement of the membrane.

17 Claims, 4 Drawing Sheets

21A

21B

```
┌─────────────────────────────────────────────────────────────────────┐
│                     41 Produce an RF probe signal                     │
└─────────────────────────────────────────────────────────────────────┘
                                    │
                                    ▼
┌─────────────────────────────────────────────────────────────────────┐
│   42 Symmetrically couple a portion of RF probe signal to first and   │
│                        second electrodes 11                           │
└─────────────────────────────────────────────────────────────────────┘
                                    │
                                    ▼
┌─────────────────────────────────────────────────────────────────────┐
│   43 Apply DC bias voltage of opposite polarities to first and second │
│                              electrodes                               │
└─────────────────────────────────────────────────────────────────────┘
                                    │
                                    ▼
┌─────────────────────────────────────────────────────────────────────┐
│                 44 Input an audio voltage to membrane 15              │
└─────────────────────────────────────────────────────────────────────┘
                                    │
                                    ▼
┌─────────────────────────────────────────────────────────────────────┐
│              45 High pass filter signal output from membrane          │
└─────────────────────────────────────────────────────────────────────┘
                                    │
                                    ▼
┌─────────────────────────────────────────────────────────────────────┐
│ 46 Multiply high-pass filtered signal modulated at the radio frequency│
│   with a portion of the probe signal and output a multiplied signal   │
└─────────────────────────────────────────────────────────────────────┘
                                    │
                                    ▼
┌─────────────────────────────────────────────────────────────────────┐
│ 47 Demodulate multiplied signal to produce an audio signal output     │
│           response to displacement of the membrane                    │
└─────────────────────────────────────────────────────────────────────┘
```

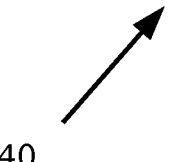

MONITORING DISPLACEMENT OF A MEMBRANE IN AN ELECTROSTATIC ACOUSTIC DEVICE

BACKGROUND

1. Technical Field

The present invention relates to electrostatic audio devices, including earphones and loudspeakers, and particularly the present invention relates to monitoring displacement of a membrane in an electrostatic acoustic device.

2. Description of Related Art

In the art of high fidelity sound reproduction, the electrostatic loudspeaker has received attention because of inherent excellent sound quality and smooth response over wide frequency ranges. In such devices, a flexible sound producing membrane is positioned near an electrode, or in the case of a push-pull arrangement, a pair of electrodes, one on either side of the membrane. A direct current polarization potential is applied between the membrane and the electrodes, and an audio signal is superimposed on the electrodes, causing the membrane to move in response to the audio signal. Electrodes are acoustically transmissive so that sound produced by the moving membrane radiates outward through the electrode to the listening area.

Electrostatic devices are highly efficient both electrically and mechanically. Electrical impedance is high and decreases with increasing acoustic frequency. High electrical impedance results in very low operating currents and minimal electrical losses. Mechanically, there are no moving parts other than the moving membrane which is very light in weight. Electrostatic devices are therefore inherently more energy efficient than electrodynamic acoustic devices currently used in battery operated electronic devices.

U.S. Pat. No. 2,968,695 disclosed a system for monitoring and controlling the motion of a moving element, in a condenser or electromagnetic microphone. An electrical signal may be derived from the change of configuration or displacement of the moving element in the microphone. The electrical signal may be utilized to monitor the motion of the moving element or may be used to duplicate the motion of the sound source in response to a known driving signal. In general, the electrical reactance between the moving and fixed elements of the microphone may change, and such reactance changes may be detected by means of an auxiliary signal of different frequency than the sound source signal. Moreover, the output of the reactance-change detecting system employed may be fed back into the energization means for the microphone and thereby serve as a means for stabilizing the output of the microphone or for operating it according to an arbitrarily chosen characteristic.

BRIEF SUMMARY

Various circuits and methods are herein disclosed for monitoring time-dependent displacement of a membrane in an electrostatic acoustic device. The electrostatic acoustic device includes the membrane, a first electrode and a second electrode. The first electrode is disposed parallel to the membrane. The membrane is configured to respond mechanically to a varying first electric field in accordance with respective electric potentials applied between the first electrode and the membrane. The second electrode is symmetrically disposed parallel to the membrane opposite from the first electrode. The membrane is configured to respond mechanically to a varying second electric field in accordance with respective electric potentials between the second electrode and the membrane. The circuit includes an oscillator configured to produce a probe signal varying at radio frequency, a first coupler configured to couple a portion of the probe signal (or signal derived therefrom) into the first electrode, a second coupler configured to couple a portion of the probe signal (or signal derived therefrom) into the second electrode, a first direct current (DC) bias supply configured to apply a first DC bias voltage to the first electrode, and a second direct current (DC) bias supply configured to apply a second DC bias voltage to the second electrode. The second DC bias voltage has an opposite polarity from the first DC bias voltage. An audio voltage input is configured to input an audio voltage to the membrane. A voltage signal from the membrane is sensed and input at a high pass filter input. The high pass filter is configured to selectively pass at least a portion of radio frequency and to selectively block at least a portion of audio frequency to produce a filtered signal modulated at radio frequency. A multiplier is configured to input at a first multiplier input at least a portion of the filtered signal modulated at radio frequency and to input at a second multiplier input at least a portion of either the probe signal or the inverted probe signal. The multiplier is configured to output a multiplied signal proportional to a multiplication of the signals at the first multiplier input and second multiplier input. A demodulator is configured to input the multiplied signal output from the multiplier and demodulate therefrom an audio output signal responsive to the time-dependent displacement of the membrane. The first DC bias voltage and the second DC bias voltage may be symmetrically applied with opposite polarities to the first and the second electrodes. Respective portions of the probe signals may be symmetrically applied with opposite polarities to the first and the second electrodes. The first and second couplers may include capacitive couplers. The circuit may further include an inverter configured to invert a portion of the probe signal to produce an inverted probe signal. The second coupler may be configured to couple a portion of the inverted probe signal to the second electrode. The first and second couplers may include respective inductors.

The oscillator may be configured to locally generate a sinusoid at the radio frequency. The probe signal may be output responsive to the locally generated sinusoid. The audio output signal may be produced by homodyne detection of the multiplied signal. The demodulator may include a low pass filter configured to produce the audio output signal responsive to the time-dependent displacement of the membrane.

BRIEF DESCRIPTION OF THE DRAWINGS

The invention is herein described, by way of example only, with reference to the accompanying drawings, wherein:

FIG. 4 is a flow diagram of a method, illustrating features of the present invention.

Figure 1:
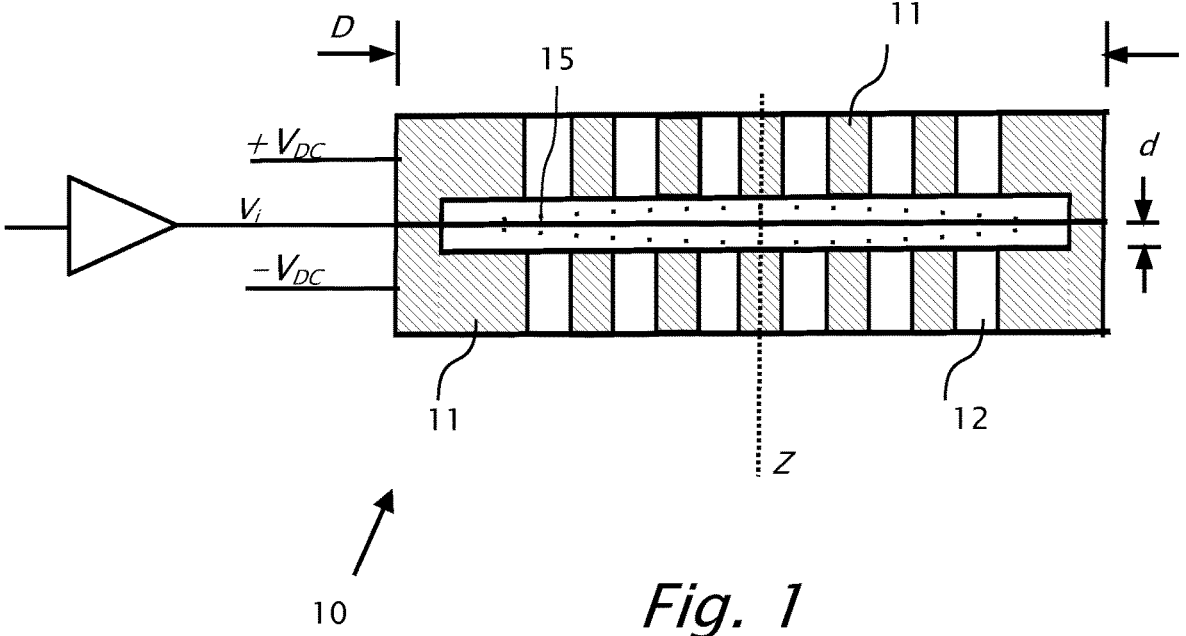
FIG. 1 illustrates schematically a cross-sectional view of an electrostatic device, according to features of the present invention.

The foregoing and/or other aspects will become apparent from the following detailed description when considered in conjunction with the accompanying drawing figures.

DETAILED DESCRIPTION

Reference will now be made in detail to features of the present invention, examples of which are illustrated in the accompanying drawings, wherein like reference numerals refer to like elements throughout. The features are described below to explain the present invention by referring to the figures.

By way of introduction, different aspects of the present invention are directed to a circuit for in-ear and/or over-ear electrostatic headphones, by way of example, for monitoring time-dependent displacement of the membrane of the electrostatic acoustic device and producing a displacement signal proportional or at least monotonic according to the membrane displacement. The membrane displacement signal and the actual membrane displacement may be proportional to each other for a frequency range below the membrane fundamental frequency in which the membrane motion resembles piston motion. For electrostatic acoustic devices in which the membrane-electrode spacing is greater than 100 microns, for a 10 to 15 millimetre diameter circular membrane, signal-to-noise ratio (SNR) may be comparable or higher than the SNR achieved in a commercial "phantom" 48V electrostatic microphone for frequencies less than the fundamental frequency of the membrane.

For frequencies above the membrane fundamental frequency, the membrane displacement signal tends to diverge from the actual membrane position averaged at its centre, due to mechanical energy coupling into the higher order eigenmodes. Symmetric features of the electrostatic acoustic device and the symmetric application of bias voltages and probe signal as described hereinafter, tend to suppress the membrane displacement signal resulting from the higher order eigenmodes and improves SNR and/or reduces audio distortion.

Circuits according to different features of the present invention may be directed to detector circuits and methods for using the acoustic device as an electrostatic microphone and/or in an electrostatic speaker for ambient noise cancellation or adjustment of acoustic transparency.

Circuits may be designed for an electrostatic speaker of maximum dimension, e.g. diameter D of millimetres or less, or in some embodiments an electrostatic speaker of dimension D of 25 millimetres or less, or in yet other embodiments an electrostatic speaker of dimension D of 10 millimetres or less. For an earphone application, an electrostatic speaker may have maximum dimension, e.g. diameter D of 5 millimetres or less. Other aspects of the present invention may include optimising dynamic range and protection from over-driving the electrostatic device.

According to features of the present invention, mechanical motion of the membrane may be forced to maintain a desired acoustic output including linearising motion of the membrane over at least a portion of a desired frequency range. The displacement signal may be used for feedback to control acoustic transparency and/or to cancel ambient noise. Mechanical response of the membrane due to acoustic ambient noise may be cancelled at least in part, i.e. ambient noise control (ANC) may be performed. Similarly, acoustic transparency of the electrostatic acoustic device may be controlled. Prior art closed-loop controllers, e.g. ANC, generally employ a speaker and multiple microphones. According to embodiments of the present invention a single electroacoustic device is sufficient to maintain a desired acoustic output.

Referring now to the drawings, reference is now made to FIG. 1, which illustrates schematically an electrostatic acoustic device 10, according to features of the present invention. Vertical axis Z is shown through a centre of acoustic device 10. A tensioned membrane 15 is supported, by edges of electrodes 11, essentially perpendicular to vertical axis Z. Membrane 15 may be impregnated with a conductive, resistive and/or electrostatic material so that membrane 15 responds mechanically to a changing electric field. The central regions of electrodes 11 are mounted proximate to, e.g. in parallel to, membrane 15, nominally equidistant, at a distance d, e.g. 20-500 micrometres from membrane 15. Electrodes 11 are illustrated as perforated or bored with apertures 12 transmissive to sound waves emanating from membrane 15 when electrostatic acoustic device 10 is operating.

During operation of electrostatic acoustic device 10, a constant direct current (DC) bias voltage, e.g. $\pm V_{DC}=\pm 50$ to $\pm 500$ volts, may be applied symmetrically to electrodes 11. Voltage signal $V_i$ may be applied to membrane 15. Voltage signal $V_i$ may vary at audio frequencies, nominally between 20-20,000 Hertz. Dotted lines illustrate schematically membrane 15 moving in response to a changing electric voltage due to voltage signals $\pm V_i$.

As distance d decreases, or as DC bias voltages $+V_{DC}$ and/or signal voltages $\pm V_i$ increase (in absolute value) then there is an increased chance for a short circuit between membrane 15 and electrode 11 and/or dielectric breakdown of air which is expected nominally at about $3\times 10^6$ Volt/meter. According to a feature of the present invention, operation of electrostatic speaker 10 may be controlled to avoid over-driving membrane 15.

Figure 2:
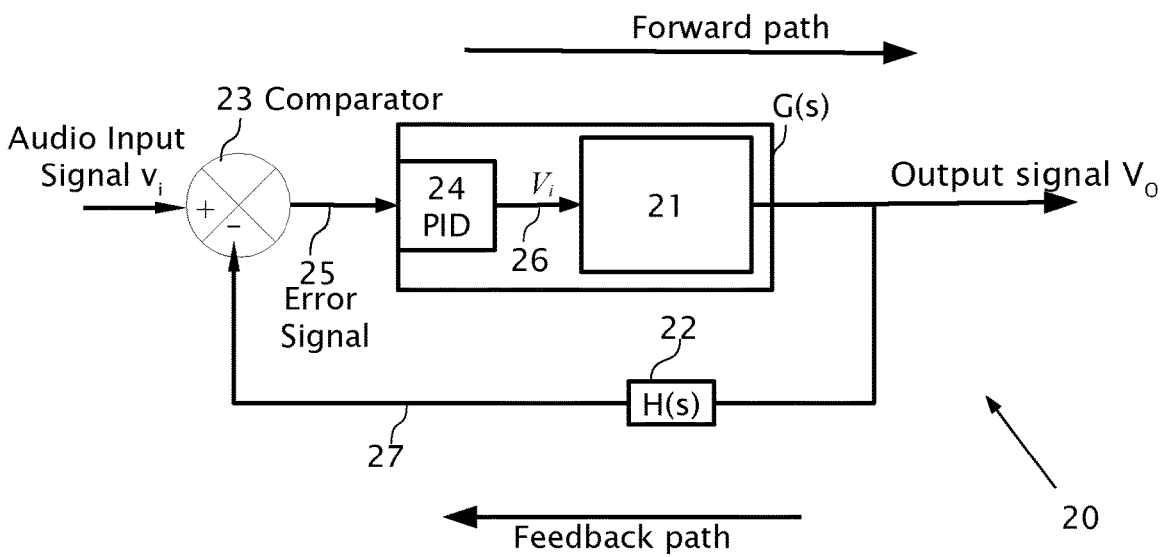
FIG. 2 is an electronic block diagram of a feedback control system, according to features of the present invention.

Reference is now made to FIG. 2, which illustrates a control system 20, according to features of the present invention. System 20 illustrates closed loop operation of electrostatic speaker 10 using lock-in detection signal of time-dependent displacement of membrane 15 and corresponding proportional voltage output $V_o$ from detection circuit 21, by way of example. In the forward path, G(s) represents open loop gain of the control circuit including system 21, where s may be a complex variable representing an alternating voltage signal in the form $A(e^{i\omega t}+\varphi)$ where A represents an amplitude, $\omega=2\pi f$ represents an angular frequency, where f represents a frequency in Hertz and $\varphi$ represents a phase shift in radians. In the feedback path, block 22 represents transform function H(s) of an output voltage signal $V_o$. The feedback path output from feedback block 22 may output a signal 27, which may be subtracted by comparator 23 from the input signal $V_i$ to produce an error signal 25 which is input to controller block 21 so that the output signal $V_o$ approaches a set point. Overall transfer function of system 20, voltage output $V_o$ divided by voltage input $V_i$ of controller 21 may be modelled by equation 1:

$$\frac{V_o}{V_i} = \frac{G(s)}{1 + G(s)\cdot H(s)} \tag{1}$$

Stability of control system 20 is contingent upon the denominator 1+G (s)·H(s) having sufficiently large absolute value and/or being non-zero. It is well known that in a resonant system 21, including a damped harmonic oscillator with an external drive that the response of an oscillator is in phase (i.e. φ≈0) with the external drive for driving frequencies well below the resonant frequency, is in phase quadrature (i.e. φ≈π/2) at the resonant frequency, and is anti-phase (i.e. φ≈π) for frequencies well above the resonant frequency. If control system 21 includes a resonance and an oscillating energy source, then in order to maintain stability, the oscillating energy source operates either below or above the resonant frequency without ever crossing the resonant frequency. In case of resonance frequency cross-over, a phase shift filter may be added to mitigate the phase response discontinuity In response to input voltage $V_i$ and/or ambient noise, distance d between membrane 15 and electrodes 11 changes resulting in a change in capacitance C of electrostatic acoustic device 10. A changing current i(t) due to input voltage $V_i$ and/or ambient noise is approximated by:

$$i(t) = V_{\text{DC}} \frac{dC}{dt} \qquad (2)$$

Still referring to FIG. 2, in response to the voltage output signal $V_o$, feedback block 22 may be configured to output signal 27 to comparator 23 which is subtracted from the input signal $v_i$. When input signal $v_i$ is nominally zero, signal 27 becomes error signal 25. Alternatively, instead of comparator 23, a signal combiner 23 may be used and feedback block 22 appropriately transforms, e.g. inverts voltage output signal $V_o$ to signal 27 which becomes error signal 25. Noise cancellation may be based on detection signal $V_o$ linear or monotonic with displacement of membrane 15 which may be fed back as signal 27 to comparator 23.

Figure 2A:
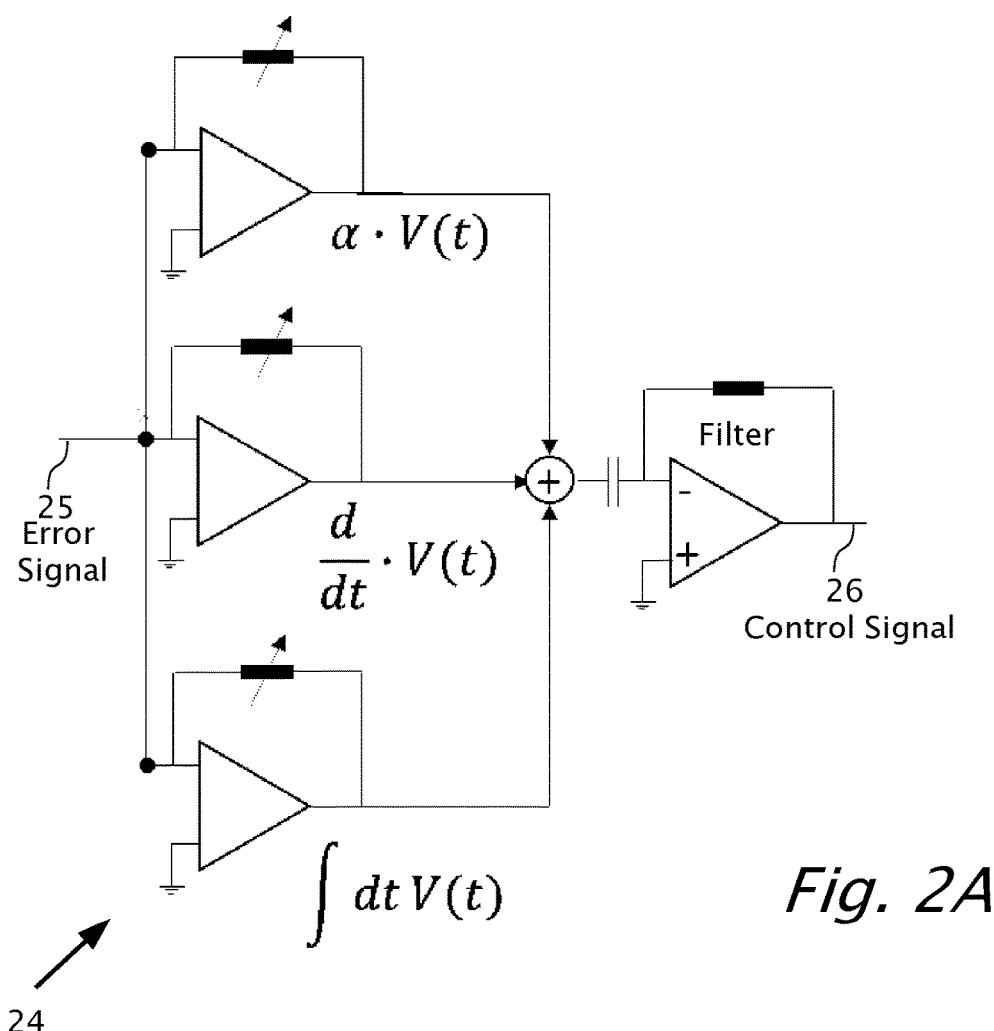
FIG. 2A illustrates an electronic block diagram of a proportional-integral-derivative controller (PID) controller, according to conventional art.

Reference is now also made to FIG. 2A, which illustrates a Proportional, Integral and Derivative (PID) block 24, according to conventional art. The feedback loop may include in the forward path G(s) a Proportional, Integral and Derivative (PID) block 24. Block 24 may include relative to error signal 25, a proportional gain, a differential and/or integration in linear combination as well as frequency filtering to output a control signal 26.

Feedback circuit 20 may be used to tune acoustic transparency of acoustic device 10 when used as an in-ear earphone or over-ear headset. Acoustic transparency is a measure of membrane 15 apparent stiffness, which controls the sound transmission coefficient from the outside space to the inner ear sealed volume through the boundary defined by membrane 15. Acoustic transparency may be controlled via electrostatic feedback actuation and position sensing with a variable gain in block 21 and/or gain adjustments within PID 24, within the effective frequency bandwidth of the feedback actuation.

Controlling the ratio between control signal 26 output $V_i$ from PID 24 and input audio signal $v_i$ using the PID gains allows a controlled audio noise cancellation and acoustic transparency (AT) adjustment within PID 24 effective bandwidth.

Figure 3:
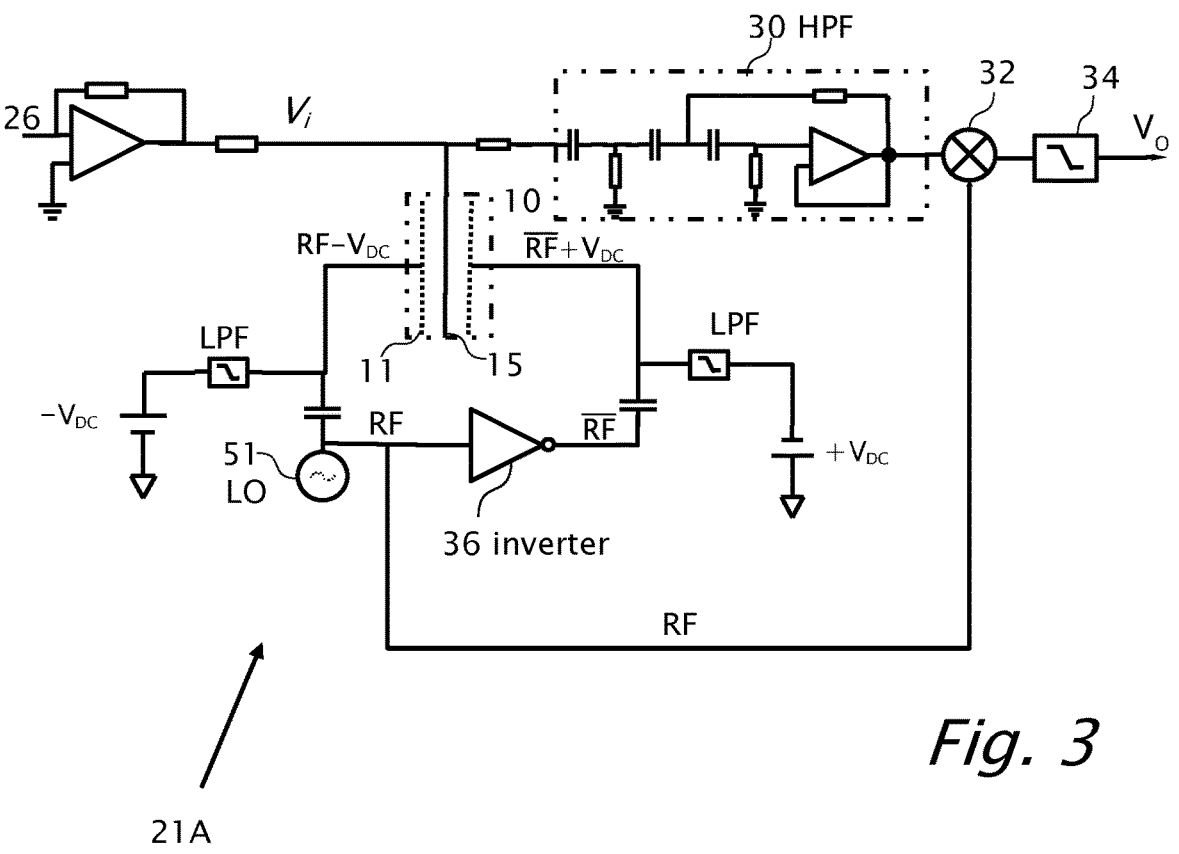
FIG. 3 is an electronic block diagram of a circuit including an electrostatic acoustic device, in the forward path of the feedback control system of FIG. 2.

Reference is now made to FIG. 3, which illustrates schematically an alternative 21A for block 21 in closed loop feedback system 20 (FIG. 2), according to features of the present invention. In controller 21A, a probe signal RF may be a sinusoid of frequency between 0.1-10 megaHertz, e.g.

1 megaHertz. Probe signal RF may be input to inverter 36 and inverted to output an inverted probe signal $\overline{RF}$ or a signal equivalently phase shifted 180 degrees. Probe signal RF from local oscillator 51 may be capacitatively coupled onto an electrode 11 and inverted probe signal $\overline{RF}$ of similar level is capacitively coupled to the other electrode 11. Similarly, bias voltages $\pm V_{DC}$ may be symmetrically applied on electrodes 11 with $-V_{DC}$ on a first electrode 11 and $+V_{DC}$ applied on a second electrode 11. Typically, on each electrode 11, RF amplitude (peak-peak) may be a few volts superimposed on a direct current voltage bias of ~100 volts with equal and opposite polarities, $RF-V_{DC}$, $\overline{RF}+V_{DC}$ respectively biasing electrodes 11.

Audio voltage $V_i$ may be applied to membrane 15. The changing current i(t) signal as in equation (2) in electrostatic acoustic device 10 due to membrane 15 displacement in accordance with input audio voltage $V_i$ and/or ambient noise is converted to a voltage signal and input to a high pass filter 30. High pass filter 30 as shown in block 21A is configured to pass the RF probe signal, between 0.1-10 Megahertz, e.g. 1 Megahertz and block the input audio voltage signal $V_i$. which is typically between 0-20000 Hertz. High pass filter 30 may be a 3-pole Chebyshev design with Salen-Key active filter topology. Other high pass filter designs may be considered by one of ordinary skill, according to different features of the present invention. The high pass filtered output from high pass filter 30 is input to a first input of a multiplier 32. The second input of multiplier 32 is a portion of RF probe signal (or inverse $\overline{RF}$ thereof). The output of multiplier 32 at least partially includes a multiplication of the signals at the input ports of multiplier 32. The output of multiplier 32 may be demodulated by a low pass filter 34, designed to pass audio frequencies including the audio output signal $V_o$ proportional to or in accordance with the displacement of membrane 15 of electro-acoustic device 10.

Figure 3A:
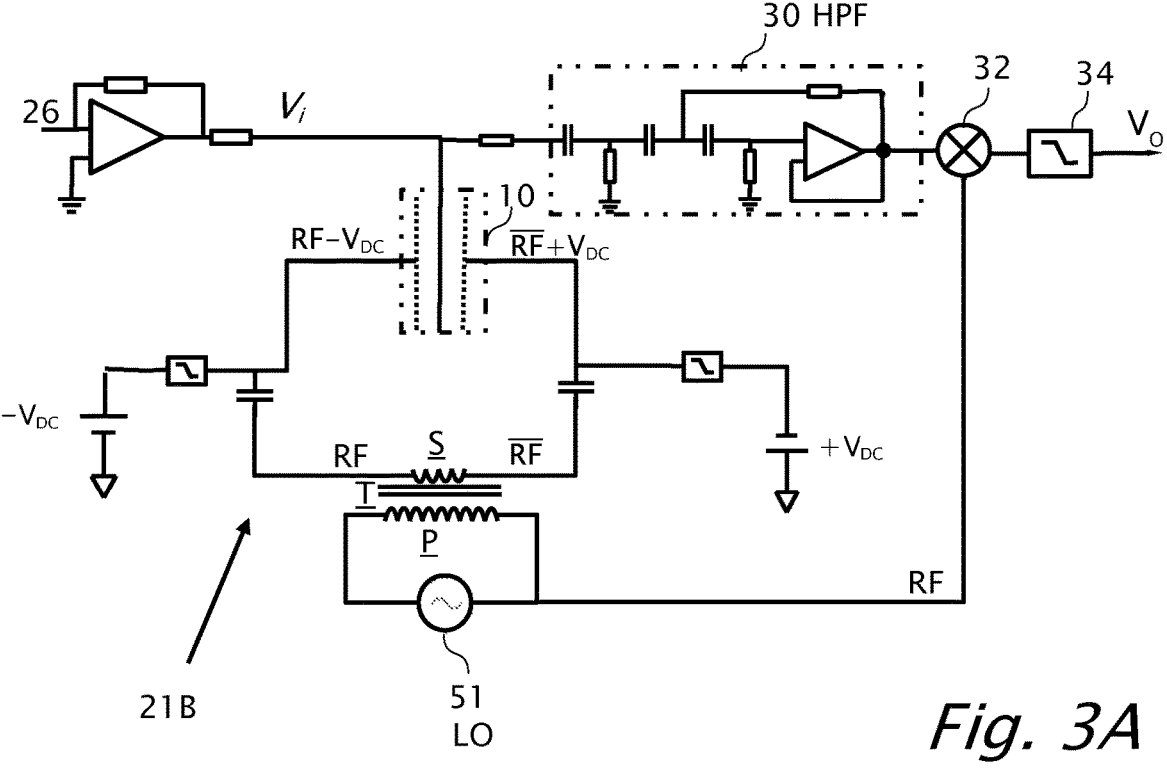
FIG. 3A is an alternative electronic block diagram of a circuit including an electrostatic acoustic device, in the forward path of the feedback control system of FIG. 2.

Reference is now also made to FIG. 3A which illustrates another alternative 21B for block 21 in closed loop feedback system 20 (FIG. 2), according to features of the present invention. Audio voltage $V_i$ may be applied to membrane 15. A probe signal from a local oscillator 51 may also be induced onto membrane 15 using a transformer T with primary P connected in parallel with local oscillator 51 and secondary S connected in series between electrodes 11. Similarly, bias voltages $\pm V_{DC}$ may be symmetrically applied on electrodes 11 with $-V_{DC}$ on a first electrode 11 and $+V_{DC}$ applied on a second electrode 11. As in block 21A, on each electrode 11, RF amplitude (peak-peak) may be a few volts superimposed on a direct current voltage bias of ~100 volts with equal and opposite polarities, $RF-V_{DC}$, $\overline{RF}+V_{DC}$ respectively biasing electrodes 11.

As in block 21A (FIG. 3) high pass filter 30 as shown in block 21B is configured to pass the RF probe signal, between 0.1-10 Megahertz, e.g. 1 Megahertz and block the input audio voltage signal $V_i$. which is typically between 0-20000 Hertz. The high pass filtered output from high pass filter 30 is input to a first input of a multiplier 32. The second input of multiplier 32 includes a portion of RF probe signal (or inverse $\overline{RF}$ thereof). The output of multiplier 32 at least partially includes a multiplication of the signals at the input ports of multiplier 32. The output of multiplier 32 may be demodulated by a low pass filter 34, designed to pass audio frequencies including the audio output signal $V_o$ proportional, monotonic to or in accordance with the displacement of membrane 15 of electro-acoustic device 10.

Reference is now made to FIG. 4, a flow diagram 40 illustrating a method according to features of the present invention. A probe signal, typically a sinusoid at radio frequency may be produced (step 41) with local oscillator (LO) 51 and symmetrically coupled (step 42) to first and second electrodes 11 with opposite polarities or equivalently phase shifted by 180 degrees. Similarly, DC bias voltages of opposite polarities may be applied (step 43) to first and second electrodes 11. An audio voltage $V_i$ may be input (step 44) to membrane 15. Current and or charge signal from membrane 15 responsive to time-dependent displacement of membrane 15 may be converted to a voltage signal and input to high pass filter 30 designed to block audio signal input and to output (step 45) an RF audio modulated signal. The RF audio modulated signal output from high pass filter 30 may be multiplied (step 46) with a portion of the probe signal (or a signal derived from the probe signal) and the multiplied signal may be demodulated (step 47) to produce an audio signal output responsive (proportional to or monotonic with) the time-dependent displacement of membrane 15.

The term "homodyne" as used herein refers to a method of detection/demodulation of a signal which is phase and/or frequency modulated onto an oscillating signal by combining that signal with a reference oscillation.

The term "phase sensitive detector circuit" as used herein is an electronic circuit including a multiplier (or mixer) and a loop filter that produces an output signal that is proportional to the product of the amplitudes of an input signal and a reference signal and to the cosine of the phase between them.

The term "transimpedance amplifier" as used herein converts current to voltage. Transimpedance amplifiers may be used to process current output of a sensor to a voltage signal output.

The term "charge amplifier" as used herein converts a time varying charge to a voltage output typically by integrated a time varying current signal.

The term "audio" or "audio frequency" refers to an oscillation rate of an alternating electric current or voltage or of a magnetic, electric or electromagnetic field or mechanical system in the frequency range 0-20,000 Hertz The term "audio signal", "audio output", "audio output signal" as used herein refer to an electrical signal varying essentially at audio frequency.

The term "radio frequency" (RF) is the oscillation rate of an alternating electric current or voltage or of a magnetic, electric or electromagnetic field or mechanical system in the frequency range from around twenty thousand times per second (20 kHz) to around three hundred billion times per second (300 GHz).

The term "transform" or "transforming" refers to phase shifting, inverting, amplifying and/or attenuating.

The term "probe signal" refers to a locally produced radio frequency, e.g. sinusoidal signal. The term "coupling" a probe signal as used herein refers to coupling a portion of the probe signal, or an RF signal derived from the probe signal by transforming the probe signal.

The term "symmetrically" in reference to applying voltages of equal magnitudes, opposite polarities and at opposite sides with respect to membrane 10.

The term "error signal" as used herein refers to a voltage signal of magnitude proportional to or monotonic with the difference between an actual output signal varying at audio frequencies and a desired audio signal.

The term "control signal" as used herein refers to a signal input to an acoustic device, responsive to an error signal, to maintain a desired voltage output signal.

The transitional term "comprising" as used herein is synonymous with "including", and is inclusive or open-ended and does not exclude additional element or method steps not explicitly recited. The articles "a", "an" is used herein, such as "a circuit" or "a probe signal" have the meaning of "one or more" that is "one or more circuits", "one or more probe signals".

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

Although selected features of the present invention have been shown and described, it is to be understood the present invention is not limited to the described features.

The claimed invention is:

1. A method for monitoring time-dependent displacement of a membrane in an electrostatic acoustic device, including the membrane, a first electrode and a second electrode, wherein the first electrode is disposed parallel to the membrane, wherein the membrane is configured to respond mechanically to a varying first electric field in accordance with respective electric potentials applied between the first electrode and the membrane, wherein the second electrode is disposed parallel to the membrane opposite from the first electrode, wherein the membrane is configured to respond mechanically to a varying second electric field in accordance with respective electric potentials applied between the second electrode and the membrane, the method comprising:

producing a probe signal varying at radio frequency;

first coupling a portion of the probe signal into the first electrode;

second coupling a transformed portion of the probe signal into the second electrode;

first applying a first DC bias voltage to the first electrode; second applying a second DC bias voltage to the second electrode, wherein the second DC bias voltage has an opposite polarity from the first DC bias voltage;

inputting an audio voltage to the membrane;

sensing a voltage signal from the membrane;

inputting at a high pass filter input the voltage signal from the membrane, the high pass filter selectively passing at least a portion of the radio frequency of the probe signal and selectively blocking at least a portion of audio frequency to produce a filtered signal modulated at the radio frequency;

inputting at a first multiplier input at least a portion of the filtered signal modulated at the radio frequency;

inputting at a second multiplier input, at least a portion of the probe signal;

outputting a multiplied signal proportional to a multiplication of the filtered signal and the probe signal at the first multiplier input and second multiplier input; and demodulating the multiplied signal thereby producing an audio output signal responsive to time-dependent displacement of the membrane.

2. The method of claim 1, wherein the first DC bias voltage and the second DC bias voltage are symmetrically applied with opposite polarities to the first and the second electrodes.

3. The method of claim 1, wherein the respective portions of the probe signals are symmetrically applied with opposite polarities to the first and the second electrodes.

4. The method of claim 1, wherein the first and second couplings are capacitive couplings.

5. The method of claim 1, the method further comprising:

inverting a portion of the probe signal to produce an inverted probe signal; and said second coupling a portion of the inverted probe signal to the second electrode.

6. The method of claim 1, wherein the first and second couplings include an inductive coupling.

7. The method of claim 1, further comprising:

locally generating a sinusoid at the radio frequency;

outputting the probe signal responsive to the locally generated sinusoid at the radio frequency.

8. The method of claim 1, wherein the audio output signal is produced by homodyne detection.

9. The method of claim 1, wherein said demodulating the multiplied signal is performed by low pass filtering.

10. A circuit for time-dependent monitoring displacement of a membrane in an electrostatic acoustic device, including the membrane, a first electrode and a second electrode, wherein the first electrode is disposed parallel to the membrane, wherein the membrane is configured to respond mechanically to a varying first electric field in accordance with respective electric potentials applied between the first electrode and the membrane, wherein the second electrode is disposed parallel to the membrane opposite from the first electrode; wherein the membrane is configured to respond mechanically to a varying second electric field in accordance with respective electric potentials between the second electrode and the membrane, the circuit comprising:

an oscillator configured to produce a probe signal varying at radio frequency;

a first coupler configured to couple a portion of the probe signal into the first electrode;

a second coupler configured to couple a transformed portion of the probe signal into the second electrode;

a first direct current (DC) bias supply configured to apply a first DC bias voltage to the first electrode;

a second direct current (DC) bias supply configured to apply a second DC bias voltage to the second electrode, wherein the second DC bias voltage has an opposite polarity from the first DC bias voltage;

an audio voltage input configured to input an audio voltage to the membrane;

a voltage signal output from the membrane;

a high pass filter input connectable to the voltage signal output from the membrane, the high pass filter configured selectively pass at least a portion of radio frequency and to selectively block at least a portion of audio frequency to produce a filtered signal modulated at radio frequency;

a multiplier configured to input at a first multiplier input at least a portion of the filtered signal modulated at radio frequency and to input at a second multiplier input at least a portion of either the probe signal or an inverted probe signal, wherein the multiplier is configured to output a multiplied signal proportional to a multiplication of signals at the first multiplier input and second multiplier input;

a demodulator configured to input the multiplied signal output from the multiplier and demodulate therefrom an audio output signal responsive to the time-dependent displacement of the membrane.

11. The circuit of claim 10, wherein the first DC bias voltage and the second DC bias voltage are symmetrically applied with opposite polarities to the first and the second electrodes.

12. The circuit of claim 10, wherein the respective portions of the probe signals are symmetrically applied with opposite polarities to the first and the second electrodes.

13. The circuit of claim 10, wherein the first and second couplers include capacitive couplers, the circuit further comprising:

an inverter configured to invert a portion of the probe signal to produce an inverted probe signal, and wherein the second coupler is configured to couple the inverted probe signal to the second electrode.

14. The circuit of claim 10, wherein the first and second couplers include an inductor.

15. The circuit of claim 10, wherein the oscillator is configured to locally generate a sinusoid at the radio frequency, wherein the probe signal is output responsive to the locally generated sinusoid.

16. The circuit of claim 10, wherein the audio output signal is produced by homodyne detection of the multiplied signal.

17. The circuit of claim 10, wherein the demodulator includes a low pass filter configured to produce the audio output signal responsive to the time-dependent displacement of the membrane.

* * * * *